United States Patent [19]

Parker

[11] 4,395,621
[45] Jul. 26, 1983

[54] TIMING CONTROL APPARATUS AND CIRCUIT

[76] Inventor: Randall W. Parker, 3165 Oser Rd., Norton, Ohio 44203

[21] Appl. No.: 127,334

[22] Filed: Apr. 10, 1980

[51] Int. Cl.³ ............................................. H05B 1/02
[52] U.S. Cl. .................................... 219/492; 219/505; 219/491; 219/514; 99/329 R; 99/329 P
[58] Field of Search ............... 219/490, 491, 492, 493, 219/497, 498, 499, 501, 505, 506, 514, 518, 510; 99/325, 327, 328, 329 R, 329 P; 307/117

[56] References Cited

U.S. PATENT DOCUMENTS

| | | | |
|---|---|---|---|
| 3,275,802 | 9/1966 | Vandivere et al. | 219/499 |
| 3,431,400 | 3/1969 | Ilda et al. | 219/492 |
| 3,581,061 | 5/1971 | Chambers | 219/499 |
| 3,898,423 | 8/1975 | Taylor et al. | 219/492 |
| 3,956,978 | 5/1976 | Burley | 219/492 |
| 4,170,932 | 10/1979 | Lalancette | 219/497 |
| 4,245,148 | 1/1981 | Gisske et al. | 219/492 |

FOREIGN PATENT DOCUMENTS 2706138  8/1978  Fed. Rep. of Germany ...... 219/497
2823058 12/1978  Fed. Rep. of Germany ...... 219/497

Primary Examiner—M. H. Paschall
Attorney, Agent, or Firm—Reese Taylor

[57] ABSTRACT

A timing control apparatus and circuit for use in a toaster or other device, such as an oven, includes electronic solid-state circuitry including a thermistor operating in conjunction with a metal oxide semiconductor (CMOS) wherein when the predetermined voltage or heat buildup is attained, a condenser is charged to positive to activate the timing circuit, which, in turn, activates a SCR, shorting a full wave bridge to deactivate the heating elements and close a normally open solenoid, which unlocks a mechanical latch and permits the toast to be ejected. The device employs low operating current, expends no energy except at the moment of triggering the solenoid and is capable of being used as original equipment or to retrofit existing units.

6 Claims, 5 Drawing Figures

TIMING CONTROL APPARATUS AND CIRCUIT

FIELD OF THE INVENTION

This invention relates in general to heat activated timing circuitry and associated apparatus and relates in particular to such circuitry for a toaster. The preferred embodiment will be described in conjunction with a toaster, but it will be apparent that the inventive concept has other applications as well.

PRIOR ART STATEMENT

Applicant is aware of the fact that the most basic prior art activiating devices of this general type consist of a bimetallic type arrangement wherein bimetallic thermostatic switches are used. Such devices present certain difficulties because the calibration and maintenance thereof present serious problems. One of the difficulties is that when the bimetallic strip is located close to the surface of the food being prepared, it is sensitive to a considerable degree to the ambient temperature within the toaster so that inaccuracy of operation may result. Also, metal fatigue can affect the accuracy of the timing. Furthermore, these strips usually have relatively large mass and area and, therefore, present a relatively long thermal lag which further leads to inaccuracy in controlling the operation of the device.

As a result of these problems, attempts have been made at producing completely electrical control systems for use in this environment, which have proven superior to the earlier mechanical or bimetallic systems.

For example, Borley U.S. Pat. No. 3,956,978 discloses a toaster using an electromagnet which holds the support bars for the toast down until it is de-energized. This particular patent discloses the use of an SCR which receives a pulse at a predetermined level from a transistor, which will then short out the electromagnet, releasing the support bar and ejecting the toast.

Jones U.S. Pat. No. 3,249,692 is also directed to a toaster and to an attempt to overcome the difficulties of the bimetallic prior art by the utilization of a thermistor.

Iida U.S. Pat. No. 3,431,400 discloses the utilization of a negative coefficient thermistor, a PNPN switching diode and a thyristor as the control means.

Holmes U.S. Pat. No. 3,320,407 is directed to a temperature control device which is solid state and is intended to replace the prior art bimetallic structure. This particular device operates by the utilization of a thermistor to sense the temperature and determine whether or not the transistor will conduct in order to control that temperature.

Welch U.S. Pat. No. 3,428,785 discloses solid state control means for controlling oven temperature.

Fox U.S. Pat. No. 3,456,095 is not directed specifically to the toaster art, but does disclose the use of a thermistor and an SCR to provide a quickly reponding heat control circuit.

Juodkikis U.S. Pat. No. 3,946,200 discloses the utilization of a Triac semiconductor as part of the control system.

SUMMARY OF THE INVENTION

While this prior art is presumably operative for the purposes for which it is designed, it is believed that Applicant's unique circuitry and apparatus presents a distinct improvement in that it provides improved efficiency and accuracy of control in that the bread condition can be precisely controlled from the first piece through infinity, thereby avoiding any problems due to ambient heat buildup. Furthermore, the circuit design is set up for a "fail safe" operation in that the solenoid employed in the circuit will not stay on if a bread charge does not release. The solenoid will simply shut off and repeat the timing cycle to avoid damage to the solenoid.

The transistor circuitry employed buffers the output and the base emitter cap allows the solenoid to shut down and recycle.

Furthermore, the timing cycle starts at the power on position, eliminating any other switches.

The device is capable of employment with either 120 or 240 volts with the substitution of one resistor only.

Full regulation allows more stable operation and the timer also will compensate automatically for any voltage fluxuation.

Accordingly, Applicant has found that the above noted advantages can be achieved by the employment of the simplified circuitry employing activating switches and a full wave bridge connected to a dropping resistor and a zener diode. A trigger circuit is provided and includes a resistor and capacitor as well as a bias resistor. A series timing resistor is then employed and is connected by a thermistor or other solid state sensor.

A variable resistor or potentiometer and a timing capacitor are then connected to an integrated circuit which has a wide operating supply voltage and a high frequency performance.

A bias resistor is also employed and a capacitor is connected thereto.

A transistor is connected thereto and is employed to energize an SCR.

A current limiting resistor is connected to a silicone controlled rectifier (SCR) and a stabilizing capacitor is employed to prevent gliching.

All of this is connected to a solenoid and to a momentarily normally opened switch to allow manual release, if desired.

Accordingly, production of an improved timing circuit of the type above described becomes the principal object of this invention with other objects thereof becoming more apparent upon reading of the following brief specification considered and interpreted in view of the accompanying drawings.

DETAILED DESCRIPTION OF THE PREFERRED EMBODIMENT

In describing the invention, the circuitry will first be described followed by a description of its application to a typical toaster.

Figure 5:
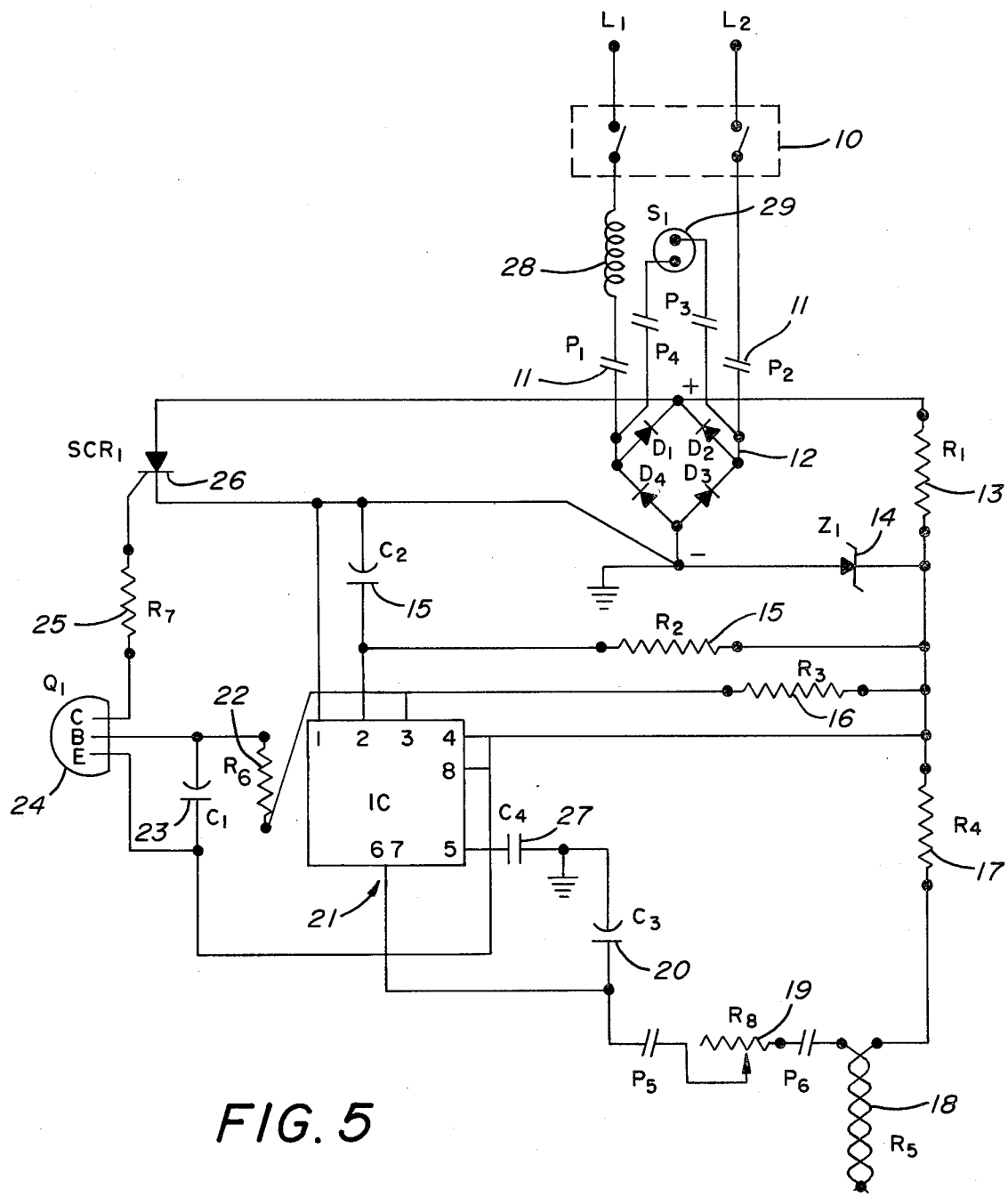
FIG. 5 is a schematic view of the improved circuitry.

The preferred embodiment of the circuitry, as illustrated in FIG. 5, includes a pair of switches $L_1$ and $L_2$, generally indicated by the numeral 10. These are both closed in the operating mode.

Connector pins 11,11 ($P_1$, $P_2$, $P_3$, $P_4$) are employed to connect the circuit to a full wave bridge comprising diodes $D_1$, $D_2$, $D_3$ and $D_4$. Also, pins 11,11 ($P_1$, $P_2$, $P_3$, $P_4$) and $P_5$ and $P_6$ enable the entire electronic package to be installed and removed as a unit.

A dropping resistor 13 ($R_1$) is next connected into the circuit and a zener diode 14 ($Z_1$) leads to the negative output.

A circuit 15 comprising a resistor ($R_2$) and a capacitor ($C_2$) is employed as a trigger circuit and connected to a bias resistor 16 ($R_3$).

A series timing resistor 17 ($R_4$) leads to a thermistor 18. That thermistor is effectively a temperature compensator and while FIG. 5 of the drawings illustrates it as a thermistor, any comparable solid state sensor also could be used. This particular element decreases resistance as the temperature goes up and compensates therefor.

A variable resistor or potentiometer 19 ($R_8$) is connected by pin $P_5$ to a timing capacitor 20 ($C_3$). This is, in turn, connected to pins on the integrated circuit 21 (CMOS), which is operated with a low supply of current and a wide operating supply of voltage. This unit is capable of high frequency performance and accurate time delays. One resistor and one capacitor control the time and, therefore, no decoupling is required to prevent multiple output gliching during transition.

A bias resistor 22 ($R_6$) is provided for the transistor 24. A capacitor 23 ($C_1$) is also provided so that if for any reason the solenoid 28 will not energize, the capacitor 23 will start to charge through the bias resistor 22 and will cut off all power and cause the unit to recycle. Bias resistor 22 and capacitor 23 form an RC circuit which allows the timer to reset on any malfunction of the solenoid 28, for example.

A transistor 24 is then employed to energize an SCR 26. These are interconnected by a current limiting resistor 25 ($R_7$). A stabilizing capacitor 27 ($C_4$) can also be employed to avoid gliching and the solenoid 28 is actuated, of course, by the SCR 26, shorting the bridge and energizing and closing the solenoid. This releases the rack permitting the switches 10 ($L_1$, $L_2$) to open the toast to be ejected and the switches 10 ($L_1$, $L_2$) inactivate the heating elements E (not shown).

Switch 29 is a momentary normally open switch which can be used in case of malfunction of energize solenoid 28 to trigger the circuit regardless of the timer output.

Turning then to the working environment in which the circuitry which has been described may be used, reference is made to FIGS. 1 through 4 of the drawings.

Figure 1:
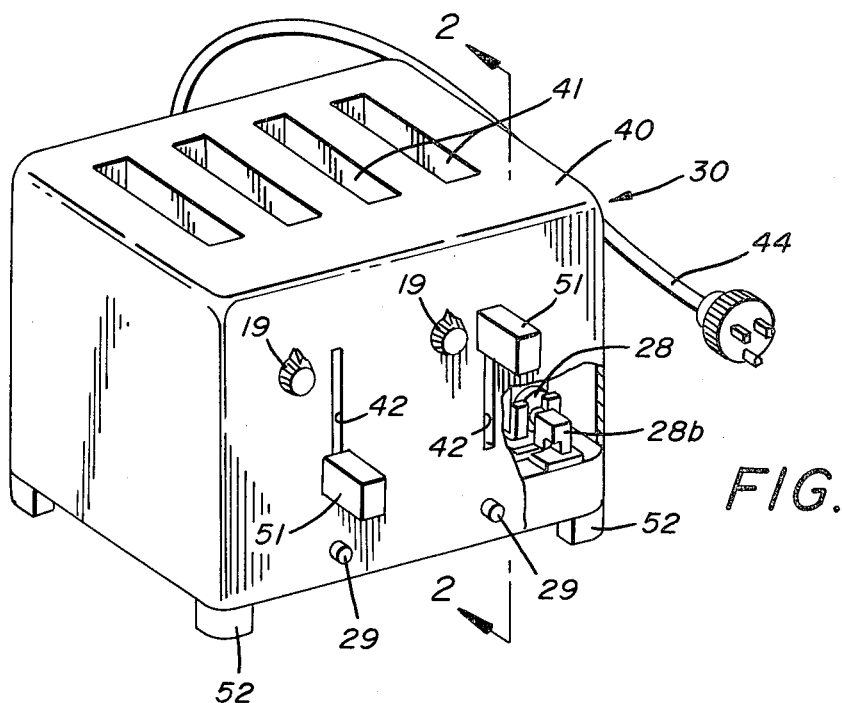
FIG. 1 is a perspective view of a typical toaster partially broken away to show the location of the timing apparatus.

In FIG. 1, a conventional toaster 30 is illustrated and includes a cover 40 and a frame 50. The cover 40 has openings 41 in its top surface to receive the bread and, of course, the number of openings is not relevant to the invention, although four are illustrated. The face of the cover 40 also has openings 42, which permit access to the operating handles 51,51. Also projecting beyond the front surface of the cover 40 are controls 19,19 or potentiometers which permit varying settings to be achieved.

Finally, an electrical cord 44 is provided as is conventional to furnish operating power.

The frame 50 will not be described in great detail except to refer to the fact that support legs 52,52 are employed and the frame is a generally rectangular frame and supports not only the mechanical apparatus which receives and ejects the toast and the heating elements, but the electronic circuitry which controls that operation.

Figure 2:
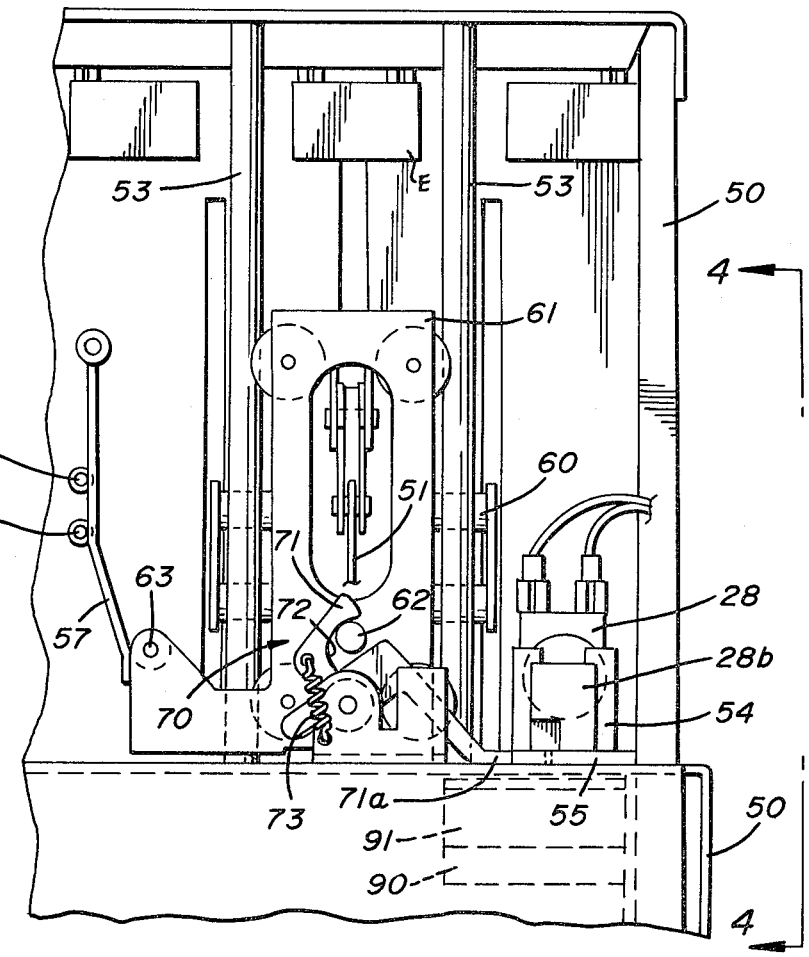
FIG. 2 is a partial front view of the toaster of FIG. 1 with the protective cover removed and with the toaster in the loaded position.
Figure 3:
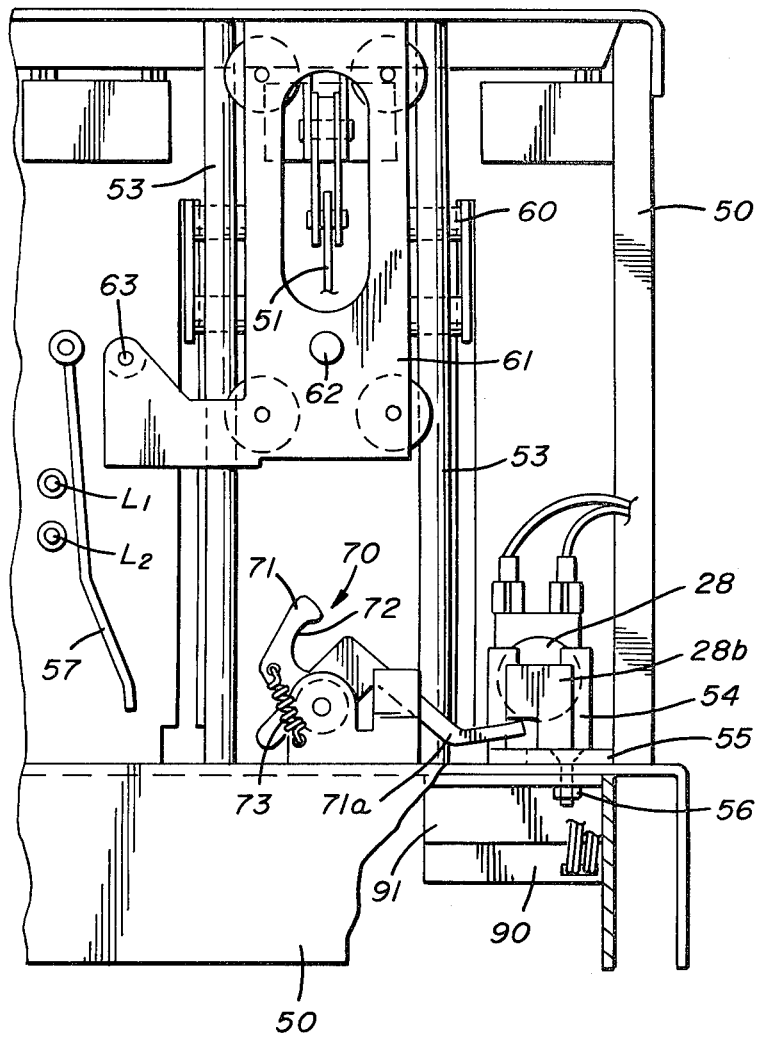
FIG. 3 is a view similar to FIG. 2 with the toaster in the unloaded position.
Figure 4:
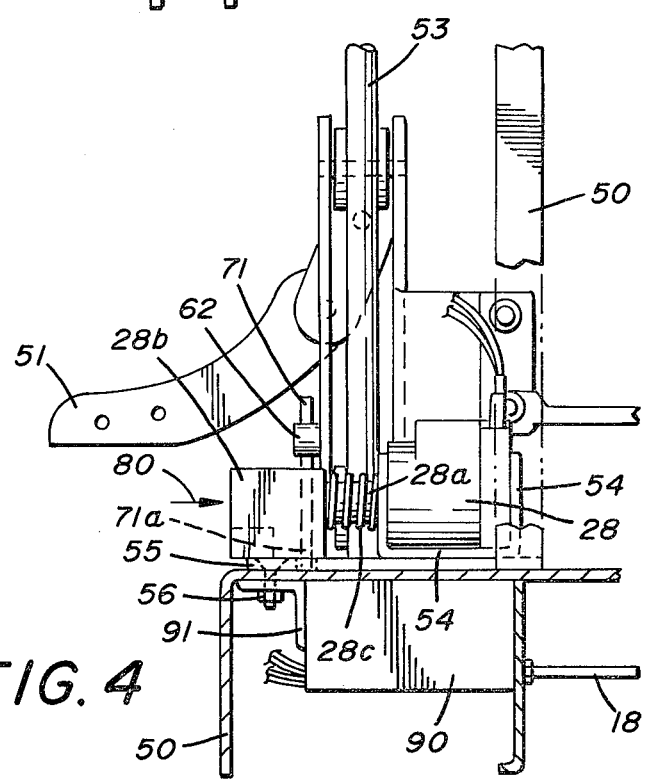
FIG. 4 is a view taken on the line 4—4 of FIG. 2.

Turning then to FIGS. 2, 3 and 4, it will be noted that each rack or carriage 60, which receives the bread, has its own actuating mechanism. Again, without going into great detail on the physical structure of the toaster itself, it will be noted that the frame 50 includes upright rods 53,53 and each rack 60 travels thereon and is connected to operating handle 51. The racks are spring-actuated and the spring will normally urge them to the upward position illustrated in FIG. 3 of the drawings. The spring structure is not illustrated since it is conventional.

Each of the racks 60 also has a plate 61 secured thereto and that plate has a forwardly projecting pin 62.

Mounted on the base of the frame 50 is a latching mechanism 70, which includes a spring loaded pivoted arm 71 which has a cut-out area 72 for engagement with the pin 62 when the rack 60 is in the loaded position as illustrated in FIG. 2 of the drawings.

The solenoid 28 is, as discussed above, normally inert or inactive and its projecting arm 28a carries a cam member 28b on its outboard end. A spring 28c normally urges that cam 28b to the outward position illustrated in FIG. 4 of the drawings.

In that position, the cam engages the end 71a of the arm 71 and holds the rack 60 in the down position during which time the heating elements are activated and the bread is being toasted.

The solenoid 28 is held in a U-shaped support 54, which is received on plate 55. The electronic components are contained in a box 90 with an L-shaped plate 91 on one face thereof. Plate 55 can be secured to plate 91 by screw 56 to readily secure the control to the frame 50.

In operating the toaster, assuming the unit to be in the positon of FIG. 3, the bread is inserted through openings 41,41 onto rack 60. The control of potentiometer 19 is set for the desired degree of doneness and handle 51 is depressed. This has several consequences.

First, as plate 61 moves downwardly, cam 63 engages spring 57 which closes switches 10 ($L_1$, $L_2$) to activate the heating elements.

Second, pin 62 will be engaged with arm 71 so that rack 60 will be held down by the force of spring 73, keeping in mind that the cam 28b of solenoid 28 is in the extended position and in engagement with end 71a of the arm.

Third, the timing circuit will be activated.

Upon achievement of the desired heat level or degree of doneness, the circuitry will be activated as described above. At that time, the solenoid is actuated and the cam 28b is retracted in the direction of the arrow 80 overcoming the force of the spring 28c. That moves the cam member 28b out of engagement with the end 71a of the arm 71 permitting the arm to be moved from the position of FIG. 2 to the position of FIG. 3 under the force of spring 73. This releases the rack 60 and permits the mechanical features to take over and the rack to move from the position of FIG. 2 to the position of FIG. 3 and eject the toast from the toaster. At the same time, spring 57 is released so that switches 10 ($L_1$, $L_2$) may open to deactivate the heating elements.

While a full and complete description of the invention has been set forth in accordance with the dictates of the Patent Statutes, it should be understood that modifications can be resorted to without departing from the spirit hereof or the scope of the appended claims.

It should be noted that the invention may be used to retrofit existing toasters or installed as original equipment.

It should also be noted that while the solenoid 28 and electronic components in box 90 are illustrated as separate components, they are capable of being encapsulated in one package.

Also, while an AC solenoid has been illustrated, a DC rotary solenoid could be employed.

Finally, while the invention has been illustrated and described in connection with a toaster, it is believed apparent that it could also be used with other heat producing devices such as, for example, ovens.

What is claimed is:

1. An electric toaster comprising:
   (A) a frame;
   (B) at least one spring loaded rack for reception of bread to be toasted and being movable from an unloaded position to a loaded position against the force of a spring;
   (C) a solid state control mounted on said frame and including
      (1) means for mechanically engaging said rack and holding said rack in loaded position including a normally inert AC solenoid with a spring loaded plunger normally urged to an extended position and movable to a retracted position upon activation of said timing means,
      (2) sensing and heat compensating means disposed on said frame,
      (3) timing means connected to said sensing and heat compensating means and adapted to release said means for mechanically holding said rack in loaded position upon attainment of a predetermined heat build up, and
      (4) trigger circuit means carried by said solid state control for recycling said timing means in response to failure of said means for holding said rack in loaded position.

2. The toaster of claim 1 wherein said timing means includes an integrated circuit incorporating a metal oxide semiconductor element.

3. The toaster of claim 1 wherein said sensing means is a thermistor.

4. The toaster of claim 1 wherein said toaster includes heating elements, and switches disposed on said frame for activation of said heating elements upon movement of said rack from unloaded to loaded position and deactivation of said heating elements upon activation of said means for mechanically engaging said rack and movement of said rack from loaded to unloaded position.

5. The toaster of claim 1 wherein a variable resistor is connected to said timing means for varying the predetermined heat build up.

6. The toaster of claim 1 wherein said timing means include a single variable resistor and a single capacitor.

* * * * *